United States Patent
Müller

[11] Patent Number: 6,146,072
[45] Date of Patent: Nov. 14, 2000

[54] PRESS FORM ELEMENT, METHOD OF INSTALLATION AND ASSEMBLY

[75] Inventor: Rudolf Müller, Frankfurt, Germany

[73] Assignee: Profil Verbindungstechnik GmbH & Co. KG, Friedrichsdorf, Germany

[21] Appl. No.: 08/923,214

[22] Filed: Sep. 4, 1997

Related U.S. Application Data

[63] Continuation-in-part of application No. 08/698,870, Aug. 16, 1996.

[30] Foreign Application Priority Data

Aug. 18, 1995 [DE] Germany .......................... 195 30 466
Nov. 19, 1996 [DE] Germany .......................... 196 47 831

[51] Int. Cl.[7] .................................................. B23P 11/00
[52] U.S. Cl. .......................... 411/176; 411/177; 411/180
[58] Field of Search ........................... 411/176, 177, 411/166, 180, 187, 188, 184

[56] References Cited

U.S. PATENT DOCUMENTS

| | | |
|---|---|---|
| 3,253,631 | 5/1966 | Reusser . |
| 3,282,315 | 11/1966 | Zahodiakin . |
| 3,282,317 | 11/1966 | Zahodiakin ........................ 411/188 X |
| 3,299,500 | 1/1967 | Double . |
| 3,345,736 | 10/1967 | Jakeway . |
| 3,556,189 | 1/1971 | Ernest . |
| 3,724,520 | 4/1973 | Ladouceur et al. . |
| 3,810,291 | 5/1974 | Ladouceur . |
| 3,871,264 | 3/1975 | Hallock . |
| 3,926,236 | 12/1975 | Pouch et al. . |
| 4,004,483 | 1/1977 | Hallock . |
| 4,430,034 | 2/1984 | Fujikawa . |
| 4,637,766 | 1/1987 | Milliser . |
| 4,708,556 | 11/1987 | Pamer et al. . |
| 5,174,018 | 12/1992 | Muller . |
| 5,339,509 | 8/1994 | Sawdon et al. . |
| 5,531,552 | 7/1996 | Takahashi et al. . |
| 5,549,430 | 8/1996 | Takahashi et al. . |

FOREIGN PATENT DOCUMENTS

| | | |
|---|---|---|
| 0438105A1 | 1/1991 | European Pat. Off. . |
| 0759510A1 | 8/1996 | European Pat. Off. . |
| 2227039 | 12/1972 | Germany . |
| 2441977A1 | 3/1975 | Germany . |
| 2229499C3 | 7/1976 | Germany . |
| 2607334A1 | 8/1977 | Germany . |
| 2846913A1 | 2/1980 | Germany . |
| 3019070A1 | 5/1981 | Germany . |
| 80027903 | 7/1982 | Germany . |
| 3132599A1 | 9/1982 | Germany . |
| 3314487A1 | 11/1983 | Germany . |
| 2441977C2 | 4/1985 | Germany . |
| 3524306A1 | 1/1986 | Germany . |
| 4333052A1 | 3/1995 | Germany . |
| 295 09 439 U1 | 10/1995 | Germany . |
| 19508632A1 | 9/1996 | Germany . |
| 1270175 | 4/1972 | United Kingdom . |

OTHER PUBLICATIONS

Translation of German Search Report dated Jun. 30, 1997 relating to German Patent Application No. 196 47 831.6.

Mechanische Verbindungen videografisch analysieren (Bander Bleche Rohre Jun. –1993).

*Primary Examiner*—Terry Lee Melius
*Assistant Examiner*—Fredrick Conley
*Attorney, Agent, or Firm*—Howard & Howard

[57] ABSTRACT

A functional element comprising a shaft part and a head part, or a hollow body part, for attachment to a sheet metal part, in particular for liquid-tight and/or gas-tight attachment to the sheet metal part, without penetrating or perforating the sheet metal part, is characterized in that the head or body part has at least one undercut feature either in an open hollow cavity at its end face confronting the sheet metal part and/or at its outer periphery and is formed in the regions which enter into contact with the sheet metal part with exclusively rounded shaping edges which, during the insertion of the element, cooperate with a shaping die button in order to provide a hooked engagement in form-fitted manner of the sheet metal material, with the undercut feature or with the undercut features. A method of attaching a functional element to a sheet metal part, a component assembly and also at least one die button and a setting head are disclosed and claimed.

18 Claims, 7 Drawing Sheets

PRESS FORM ELEMENT, METHOD OF INSTALLATION AND ASSEMBLY

RELATED APPLICATIONS

This application is a continuation-in-part application of U.S. Ser. No. 08/698,870 filed Aug. 16, 1996 which claims priority to German Application Serial No. 19530466.7 filed Aug. 18, 1995. Further, this application claims priority to German Application No. 19647831.6 filed Nov. 19, 1996.

FIELD OF THE INVENTION

The present invention relates to a method for the sealed attachment, in particular for the liquid-tight and/or gas-tight attachment of a functional element, in particular of a functional element having a head part and a functional part, to a sheet metal part in which the element does not penetrate through the sheet material but is secured to the sheet metal part for the transmission of axial forces and preferably also of torques. Furthermore, the present invention relates to a functional element, to a component assembly comprising the functional element and a sheet metal part, and also to a die button and to a setting head for use in the method of attaching a functional element to the sheet metal part.

DESCRIPTION OF PRIOR ART

In the construction of vehicle bodies in particular, but not exclusively, the need frequently exists to provide an absolutely liquid-tight and preferably also gas-tight connection between a sheet metal part and a functional element having a shaft part and a head part. As used herein, a functional element is a device which, following attachment to a sheet metal part or panel as disclosed herein, is designed to perform a function, Such as a male or female fastener, which may be used to attach another element or part to the sheet metal part. By way of example, pegs can be provided in the floor region of a vehicle and represent functional elements to which carpets are to be secured. Water, for example, coming in from the road, must in any event be prevented from rising upwardly through capillary gaps created as a result of the perforation of the sheet metal floor during the attachment of the functional element, and thus leading to corrosion of the sheet metal floor, or of the functional element, or the carpet suffering damage due to rising moisture.

It is indeed possible, with very accurate process control, to make a liquid-tight and/or gas-tight connection with bare sheet metal parts or sheet metal parts with metallic coatings, using already known piercing and riveting bolts. However, the mass production of products at reasonable cost is not possible in this way, in particular when the tools wear during long manufacturing series and when the sheet metal parts are subject to tolerances.

The liquid-tight and/or gas tight attachment of fastening elements to sheet metal parts which are coated on one or both sides with plastic, with foils and/or with paint coatings, represents a particular difficulty because the coating is frequently damaged during the insertion process, and capillary gaps are thereby created. Moreover, a loosening of the connection can be expected during subsequent thermal treatments, for example during the application of paint in a heated chamber, and can also lead to unexpected capillary gaps.

A connection which is absolutely liquid-tight and/or gas-tight can presently actually only be ensured with so-called welded elements, which are butt-welded onto the sheet metal surface. The use of functional elements which can be welded on is, however, not straightforwardly reconcilable with modern methods during sheet metal processing because it disturbs the course of the sheet metal processing, which largely takes place in presses, i.e. it represents a foreign step. The heat generated during welding is also in many cases disruptive because it can lead to a local reduction of the characteristics of the sheet metal part. With coated sheet metals the use of a welding process is particularly difficult because the coating is locally damaged by the heat-intensive welding process. For sheet metal parts which are provided with plastic and/or foil and/or paint coatings, it is, moreover, difficult to always ensure a good electrical connection between the sheet metal part and the element during butt-welding. When this is achieved, then gases which are also partly poisonous are liberated as a result of the process heat.

It is in some cases also important to connect functional elements in the form of hollow body elements with a hollow body part, for example in the form of a nut element, to a sheet metal part, without a gas or a liquid being able to pass through the sheet metal part into the hollow element. For example, such requirements likewise arise during the construction of vehicle bodies or the manufacture of injection-molded parts with inserts in the form of sheet metal parts equipped with nut elements, where the injection molding composition is not allowed to penetrate through the sheet metal part into the thread.

OBJECT OF THE INVENTION

The object of the invention is to make available a method and/or a functional element and a component assembly in which a connection which is at least substantially always liquid-tight and preferably also gas-tight is ensured between the functional element and the sheet metal part with a procedure which involves little heat and indeed without any eventually present coating of the sheet metal part being so damaged that the functionality of the desired appearance of the component assembly is no longer present. Furthermore, the method should be capable of being achieved without special complexity during the mass manufacture of sheet metal parts using favorably priced tools and over long production series.

BRIEF DESCRIPTION OF THE INVENTION

In order to satisfy this object, provision is made for the element to be connected to the sheet metal part by a shape-giving joining process, with the procedure preferably being such that the sheet metal part is connected in form-fitted manner to the head part, or in the case of using a hollow element, to the body of the hollow element, without perforating the sheet metal part, by the action of force between a setting head which guides the functional element and is arranged on one side of the sheet metal part and a die-button arranged on the other side of the sheet metal part.

Since the sheet metal part is not perforated during the attachment of the functional element, the sheet metal part is so to say preserved as a closed membrane so that no capillary gaps can arise between the two sides of the sheet metal part. It is admittedly not straightforwardly possible in this manner to produce a connection between the functional element and the sheet metal part which has the same resistance to pulling out of the functional element as a connection in which the head part of the element is arranged on the other side of the sheet metal from the shaft part. One can, however, certainly achieve an adequate strength of the connection, which is fully sufficient in many of the applications which exist and in which the maximum strength of the connection is not required, for example for the attachment of carpets in vehicles for the mounting of headlinings in vehicles or during installation of brake lines, cables, lamps and the like.

So-called through-joining processes and punch-riveting processes are admittedly known which do not, as a rule, lead to perforation of the sheet metal part. In the through-joining method, two sheet metal parts are secured to one another in known manner, with the two sheet metal parts being deformed in such a way that they are hooked into engagement within each other in a form-fitted manner. However, no functional element and also no auxiliary element is used here. During punch-riveting, an auxiliary element in the form of a punch rivet is admittedly used for the connection of two sheet metal parts, the punch rivet does not, however, represent a functional element and has no form of shaft or functional part. Moreover, modified versions of punch rivets are admittedly known which are connected to a shaft part and which are intended for insertion into only one sheet metal part. With these punch rivets a perforation of the sheet metal part via the punch rivet is not necessarily intended, but however occurs in some cases when considered statistically, so that this known method also does not make it possible to achieve a liquid-tight and/or gas-tight mounting, which is suitable for mass production.

With the method of the invention several possibilities exist of achieving the form fitted connection between the sheet metal part and the head or body part of the functional element. For example, to produce the form-locked connection, the head part or the body part is formed with an open hollow cavity at its end face facing the sheet metal part, with the hollow cavity having at least one undercut feature, and the sheet material is hooked into engagement with this undercut feature by means of the die button.

The formation of such undercuts in a hollow cavity is, for example, described in the above-referenced copending U.S. patent application Ser. No. 698,870 in connection with nut elements. In the method described in the U.S. application, the sheet metal part is pierced during the attachment of the nut element by a preceding hole punch so that the connection is not watertight. Nevertheless, the method disclosed there can be straightforwardly used with the subject of the present application for the formation of the undercut features, and for the formation of the features providing security against rotation, which is the reason why the content of this earlier copending U.S. patent application or of the corresponding German application 195 30 466.7 from which priority is claimed is made part of the disclosure of the present application.

Another possibility for the formation of the form-locked connection between the head part or body part of the functional element and the sheet metal part, which can be used as an alternative to the above mentioned possibility, or also in addition to it, lies in providing the head part at its outer periphery with at least one undercut feature, into which the sheet material forms a hooked engagement. In this embodiment it is particularly advantageous when the material of the head or body part of the functional element is deformed by means of the setting head in order to generate or to improve the hooked engagement.

The method in accordance with the invention, or the corresponding functional element, is particularly well suited for use with coated sheet metal parts, and in particular with sheet metal parts which are coated on one or both sides, for example with a metallic coating and/or a plastic coating and/or a foil coating and/or a paint coating and in that the shaping method is carried out by using rounded shaping edges both in the element and also at the die.

During the processing of galvanized sheet metal parts, or using coated sheet metal parts coated with zinc, the coating is also deformed during deformation of the sheet metal part and is thus preserved even after the attachment of the functional element to the sheet metal part. With plastic, foil or paint coatings, these can also be designed with modern techniques in such a way that they are not damaged by the attachment method, or are only damaged in regions which stand in close contact with the head part of the functional element, and are not, or at least substantially not, visible or accessible from the outside.

Several possibilities exist for achieving the required security against rotation. For example, features providing security against rotation can be provided in the hollow cavity of the head or body part and/or at the ring wall and/or at the end face of the head or body part confronting the sheet metal part and/or at the outer periphery of the head or body part, optionally only in the lower region of the same. For this purpose the outer periphery of the head or body part can have an oval, polygonal or grooved shape.

The requirements which are placed on security against rotation are less critical with the functional elements which are being discussed here because they are frequently attached to the complementary fastener elements not by rotation but rather by an axially directed movement or by a snap connection.

For this reason it is frequently possible to eliminate, in cost saving manner, features in the die button which would lead to a closed hooked engagement with the features of the functional element providing security against rotation. For example, when using features providing security against rotation in accordance with the above mentioned copending U.S. patent application, the corresponding noses at the die button could be omitted. Through the multi-cornered shape of the sheet material which is deformed into the hollow cavity of the element, an adequate security against rotation is achieved with the subject of the present application without the use of these noses. This also has the advantage that the coated surface of the sheet metal part is also not damaged by tile noses.

Further, special embodiments of the subject of the invention and also further details on the underlying object can be taken from the following description of the drawings.

BRIEF DESCRIPTION OF THE FIGURES

In the following embodiments of the invention will be explained in more detail with reference to the accompanying drawings, in which are shown:

FIG. 1 a partially cross sectioned side view of a functional element of this invention, FIG. 1A a partial side view of an alternative fastening element for the functional element at FIG. 1, FIG. 2 a plan view of an end face of the functional element of FIG. 1 seen in the direction of view arrow 2, FIG. 3 a partial side partially cross-sectioned view similar to FIG. 1 of a modified embodiment of a functional element, FIG. 4 a plan end view in accordance with FIG. 2, but as seen in the direction of view arrow 4 of FIG. 3, FIG. 5 a side partially cross-sectioned view of the functional element which is ready for installation, of FIG. 1, FIG. 6 a side cross-sectional view showing the attachment of the functional element of FIG. 5 to a sheet metal part using a setting head and a die button, with the illustration being only partly sectioned and being only shown on one side of the longitudinal axis of the functional element, FIG. 7 a representation of a further embodiment of a functional element similar to FIG. 6, FIG. 8 a side partially cross-sectioned view of a representation in accordance with FIG. 1, but of a further modified embodiment, FIG. 9 a plan end view onto the end face of the head part of the functional element of FIG. 8 as seen in the direction of the arrow 9, FIG. 10 a partial side cross-sectional view illustrating a first working step during the attachment of the functional element of FIG. 8 to a sheet metal part using a setting head and a die button, FIG. 11 a partial side cross-sectioned view illustrating a later phase of the method of attachment which started in FIG. 10, FIG. 12 a partial side cross-sectioned view illustrating the end phase of the method of attachment of FIGS. 10 and 11, FIG. 13 an enlarged representation of the region of FIG. 13 characterized by 13, with a possible modification being shown, and FIGS. 14, 15, 16 and 17 drawings which correspond to those of FIGS. 6, 7, 12 and 13, but using a functional element in the form of a hollow element, wherein

DESCRIPTION OF PREFERRED EMBODIMENTS

Figure 1:
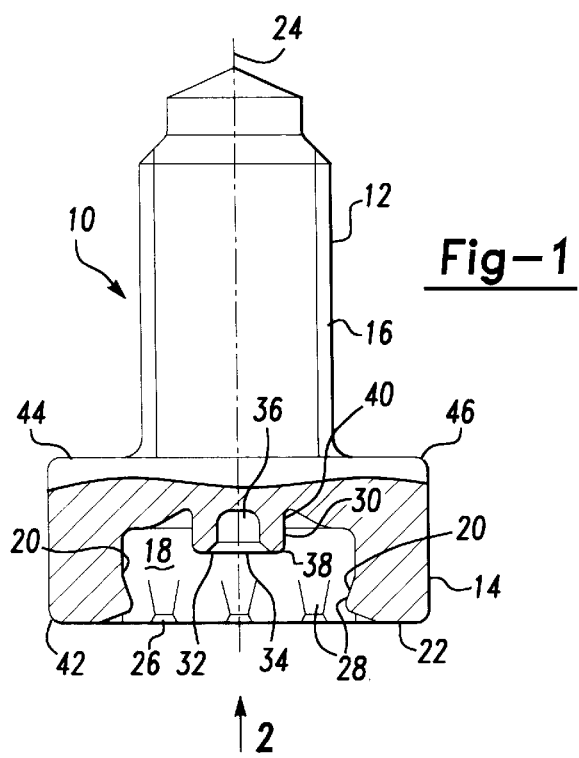

In all Figures the corresponding reference numerals are used for same part or parts which have the same function. Moreover, in all Figures in which only the right hand half of the respective embodiment is shown it should be assumed that the left hand half is designed with mirror-symmetry to the right hand half and is only being omitted for the sake of the illustration.

Figure 1A:
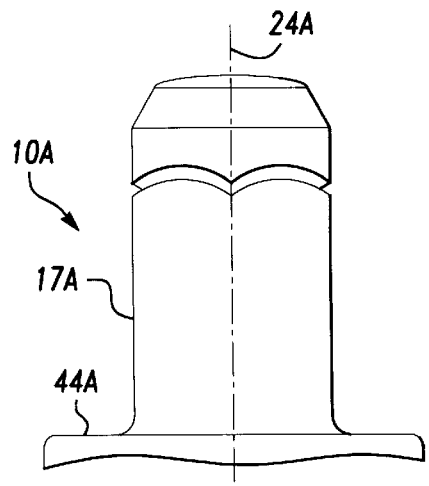
Figure 2:
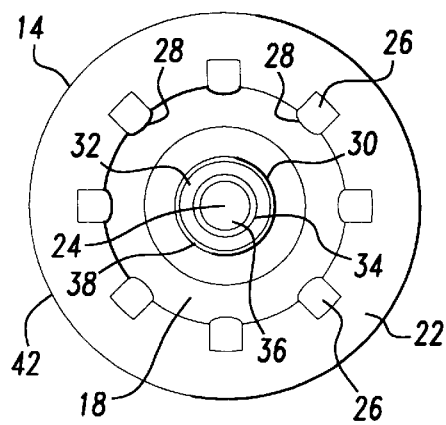

FIGS. 1 and 2 show, first of all, a functional element 10 with a shaft part 12 and a head part 14. As can be seen from FIG. 1, the shaft part 12 is provided here with a thread 16. This is, however, required as is shown in FIG. 1A, the shaft part 12 can, for example, be realized simply as a cylindrical shaft 17A. The shaft part can be fashioned in any desired manner, depending on the element with which the functional element 10 is to cooperate.

The head part 14 of this element is of hollow shape, i.e. it has a hollow cavity 18 and it is formed in its lower region in FIG. 1 in accordance with the nut element of the above-referenced copending U.S. patent application. I.e. undercut features 20 are formed by wedge-like recesses arranged in the end face 22 of the head part 14 at regular intervals around the central longitudinal axis 24, with the wedge-like recesses being produced by a correspondingly shaped cold heading tool.

As can be seen from FIGS. 1 and 2, these wedge-shaped recesses 26 have their greatest depth at the entry into the hollow cavity 18 and merge in the middle region of the circular end face 22 into this end face. The functional element thus has a circular contact surface in the outer region of the end face 22. The material displaced by the wedge-like recesses forms the noses 28, which define the narrowest part of the hollow cavity 18. In deviation from the nut element shown in the above-referenced copending U.S. patent application, the head part of the functional element of FIGS. 1 and 2 has, at the center of the base surface of the hollow cavity 18, a ring wall 30 which projects from this base surface, and which goes in the direction of the end face 22 of the head part, with the length of the ring wall, however, being selected such that it terminates before it has reached the narrowest point of the hollow cavity 18 formed by the noses 28. The ring wall 30 has its own planar end face 32. This planar end face 32 merges via a chamfer 34 into a rounded recess 36 at the center of the ring wall 30. At the radially outer side, the planar end face 32 of the ring wall 30 merges via a rounded edge 38 into the cylindrical outer wall 40 of the ring wall.

As can likewise be seen from FIG. 1, the head part has at the end face 22 a rounded peripheral edge 42 and likewise has a peripherally extending rounded edge 46 at the end face 44 adjacent the shaft part 12.

As will be subsequently explained in more detail, the undercut features 20 enable an form-fitted connection with the sheet metal part so that the functional element can only be pulled out of the sheet metal part in the axial direction with the exertion of a high force. The recesses 26 and also the regions 48 between the noses 28 form features providing security against rotation, into which the sheet metal material is embedded.

Figure 3:
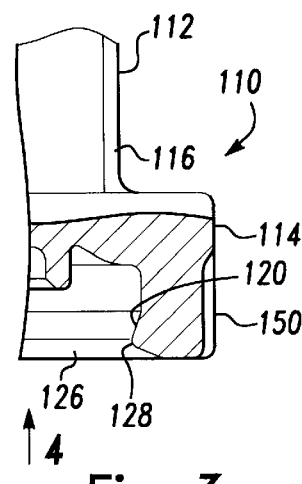
Figure 4:
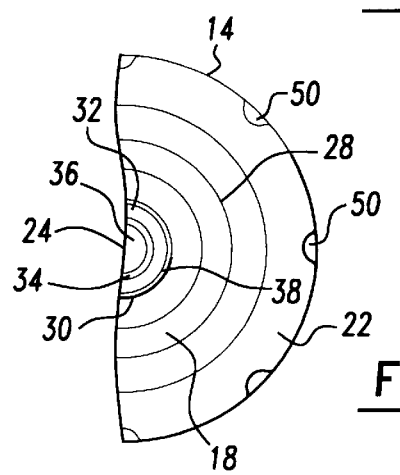

FIGS. 3 and 4 show an alternative design of the functional element of FIGS. 1 and 2, in which, in deviation from the embodiment of FIGS. 1 and 2, the noses 28 are replaced by a peripherally extending ring nose 128 and the wedge-shaped recesses 26 are replaced by a peripherally extending conical recess 126. Because the ring nose 28 and the ring recess 26 are no longer able to serve as features providing security against rotation, longitudinal grooves 150 are provided in the lower region of the outer periphery of the head part 114 and ensure the security against rotation, as will likewise be explained later in more detail.

The functional element of FIGS. 3 and 4 is also formed as a cold headed part, with the material driven out of the conical recess 126 being used to form the ring nose 128.

Figure 5:
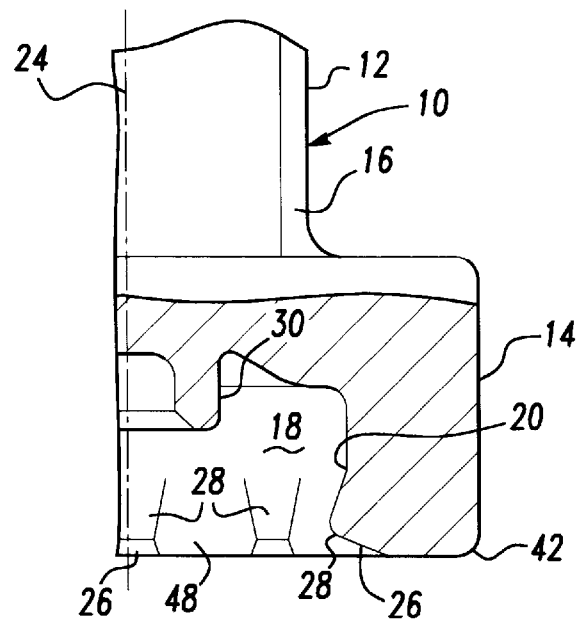
Figure 6:
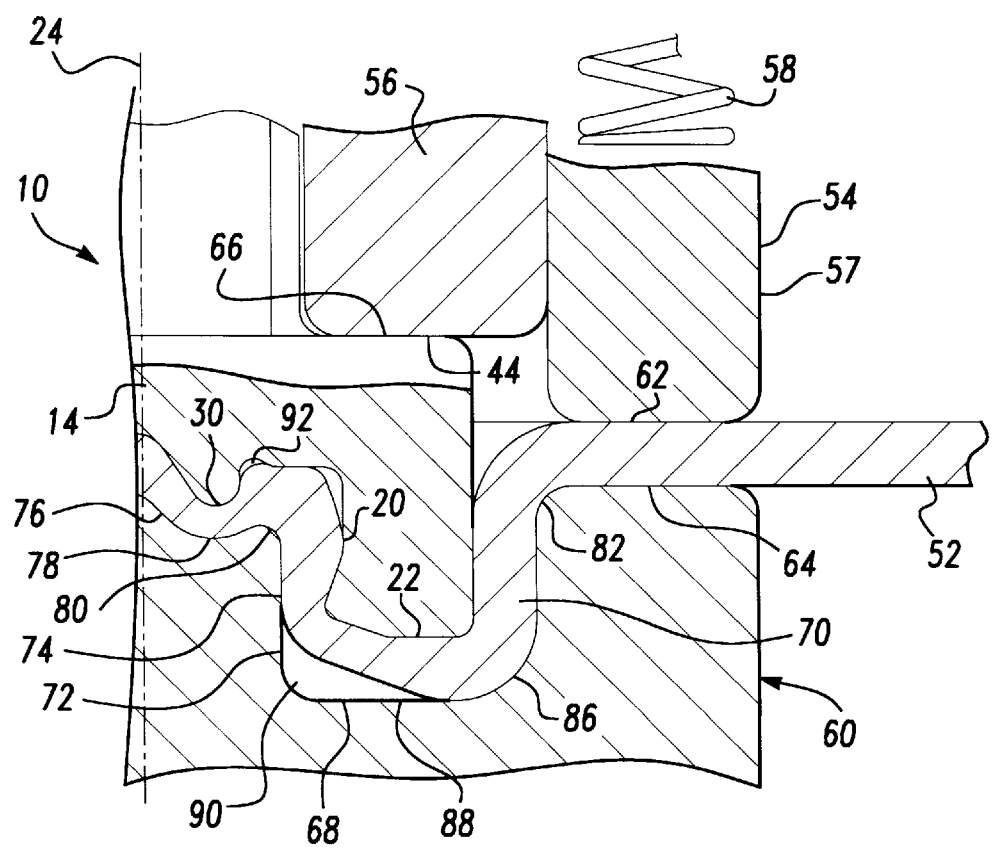

The FIGS. 5 and 6 now show the attachment of the functional element 10 of FIGS. 1 and 2 to a sheet metal part 52.

The sheet metal part 52, which is already shown in FIG. 6 in the form in which it is in form-locked connection with the head part 14 of the functional element, had, before the insertion of the functional element 10, the shape of a planar sheet metal panel, with this however not being essential. For example, the sheet metal part 52 could represent a region of a previously formed recess in the sheet metal part. It can be seen from FIG. 6 that the functional element 10 is guided by a setting head 54, which has a plunger 56 movable in the axial direction 24 and a tubular housing 57 around the latter which is biased by springs 58.

The functional element 10 is, as is presently customary during sheet metal processing, connected with the sheet metal part by means of a press and indeed by the cooperation of the setting head 54 with the die button 60. In this respect the die button 60 is received in the lower tool of the press, while the setting head 54 is attached to the upper tool of the press or to an intermediate plate of the press. Other possibilities of attachment also exist. For example, the die button 60 can be attached to the intermediate plate of the press, and the setting head 54 can be attached to the upper tool of the press, or inverse arrangements are conceivable in which the die button 60 is mounted in the upper tool of the press, and the setting head 54 in the lower tool of the press or on the intermediate plate. The use of a press is also not absolutely essential. By way of example arrangements are known in which the die button and the setting head are carried by a robot, and the required relative movement between the setting head 54 and the die button 60 in the direction of the axis 24 is achieved either by the robot itself or by the action of force from the outside.

The arrangement is so arranged that at the start of the closing movement of the press, the resiliently biased housing part 57 first clamps the sheet metal part 52 between its end face 62 and the end face 64 of the die button. The sheet metal part 52 can now no longer slip in the tool. During the further closing movement of the press, the end face 66 of the plunger 56 now contacts the end face 44 of the functional element 10 and presses the other side 22 of the head part 14 opposite to the shaft part against the sheet metal part 52, which is pressed by the closing force of the press into the ring recess 68 of the die button, with a pot-like recess or cavity 70 being formed in the sheet metal part 52 with simultaneous stretching of the same.

In the central region the die button 60 has a cylindrical projection 72 with a cylindrical outer wall 74 and a conical end face 76, which merges via a rounded ring recess 78 into a rounded ring nose 80. During the closing of the tool, the end face 76 of the die button 60 deforms the sheet metal material into the hollow cavity 18 of the head part 14 and pushes the material partly into the undercuts 20 formed by the noses 28. During the closing phase, the conical, upwardly rounded end face 76 of the cylindrical projection 72 displaces the sheet metal in the radially outward direction and simultaneously deforms the ring wall 30 via the sheet material in such a way that the spreading movement of the ring wall 30, which takes place radially outwardly, likewise pushes material into the undercuts 20.

FIG. 6 shows the state after the conclusion of the setting process and it is clearly evident that a form fitted connection has taken place between the sheet metal part and the functional element 10 in the region of the undercuts 20. As a result of the closing movement of the tool, the sheet metal material has, however, also been drawn into the recesses 26 so that a hooked engagement also takes place here and the required security against rotation is also achieved. The sheet material is, however, also pressed into the regions 48 between the noses 28 which cannot be seen from this drawing so that security against rotation also arises here. It is particularly important that the sheet metal part 52 has not been punctured at any point by the head part of the functional element 10. I.e. the sheet metal part 52 forms a continuous membrane which takes care of the absolute sealing which is required.

It can also be seen from FIG. 6 that all shaping edges of the die button, for example at the transition 82 between the planar end face 64 and the here cylindrical inner peripheral wall 84 of the recess 68 of the die button and at the transition 86 between the vertical wall 84 of the recess of the die button and the horizontal planar base surface 88 of the recess 68 and also in the region of the ring nose 80 of the recess 78 and of the tip of the conical end face of the cylindrical projection 72 are rounded. The transition between the base surface 88 of the recess 68 and the cylindrical side wall of the cylindrical projection 72 admittedly need not be rounded, but is, however, normally rounded for reasons of strength. One notes that in the region of this transition a free space 90 exists after the connection has been carried out. A further free space 92 can be seen adjacent to the deformed ring wall. These free spaces are desired because they can be filled to a greater or lesser degree, depending on the sheet metal tolerances and the flowability of the sheet metal material without damage to the tools, which would have to be feared with complete filling of these spaces.

The rounded transitions 42 of the lower end face of the functional element, in the region of the noses 28, and at the transition from the undercuts 20 into the base surface of the hollow cavity 18, and also at the edges of the ring wall 30, are also formed as rounded forming surfaces. In this manner one avoids an injury of the sheet metal part 52, which could eventually lead to perforation of the latter.

After the connection in accordance with FIG. 6 has been completed, the sheet metal part 52 not only has a pot-like recess 70, into which the head part 14 and the functional element 10 is partly received, but rather an inverse pot-like shape in the center of the base region of this pot, where the sheet metal material was pressed into the hollow cavity 18 of the head part.

Figure 7:
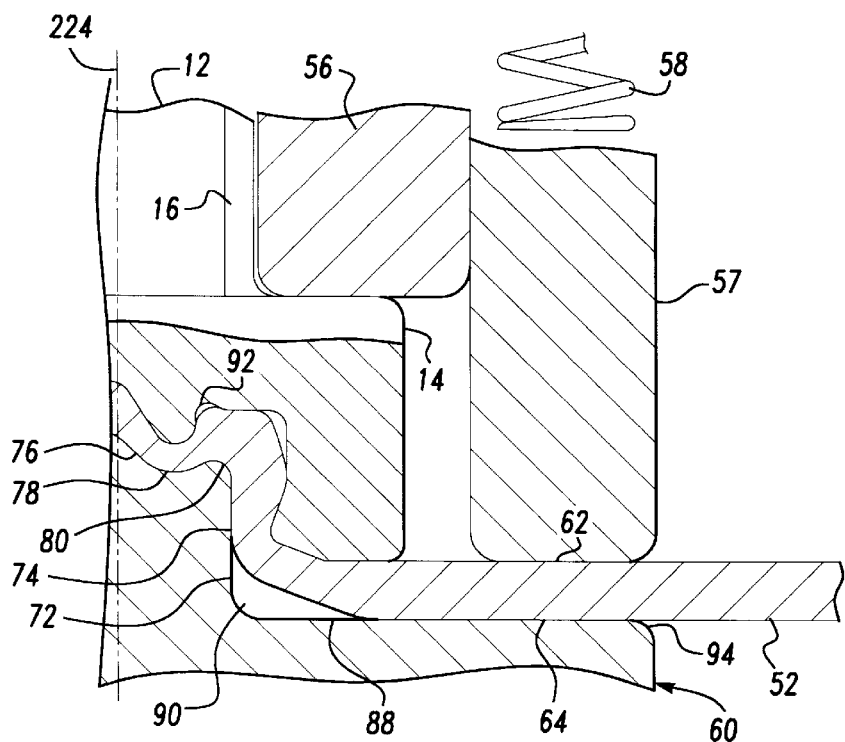

FIG. 7 shows that the pot-like recess 70 in the die members surrounding of the head part of the functional element 10 by the sheet metal part 55 is not necessary. In the embodiment of FIG. 7, the die button has no recess 68, but rather the base surface 18 of the die button has been extended up to the radially outermost edge 194 of the die button and thus forms the end face of the die button. The die button 160 of FIG. 7 has, however, cylindrical projections 172 in the central region, with the central projection having the same shape as the cylindrical projection 72 of the embodiment of FIG. 6. One notes from FIG. 7 that the sheet metal part 152, which is likewise to be understood as a planar sheet metal part prior to the attachment of the functional element 10, is likewise clamped, at least in the region of the setting head, in the region of the head part between the end face 62 of the resiliently biased housing 57 and the end face 64 of the die button. In other respects, the functional description and also the description of the design of the apparatus for the embodiment of FIG. 7 is precisely the same as for the embodiment of FIG. 6, which is why the description need not be repeated here.

Figure 8:
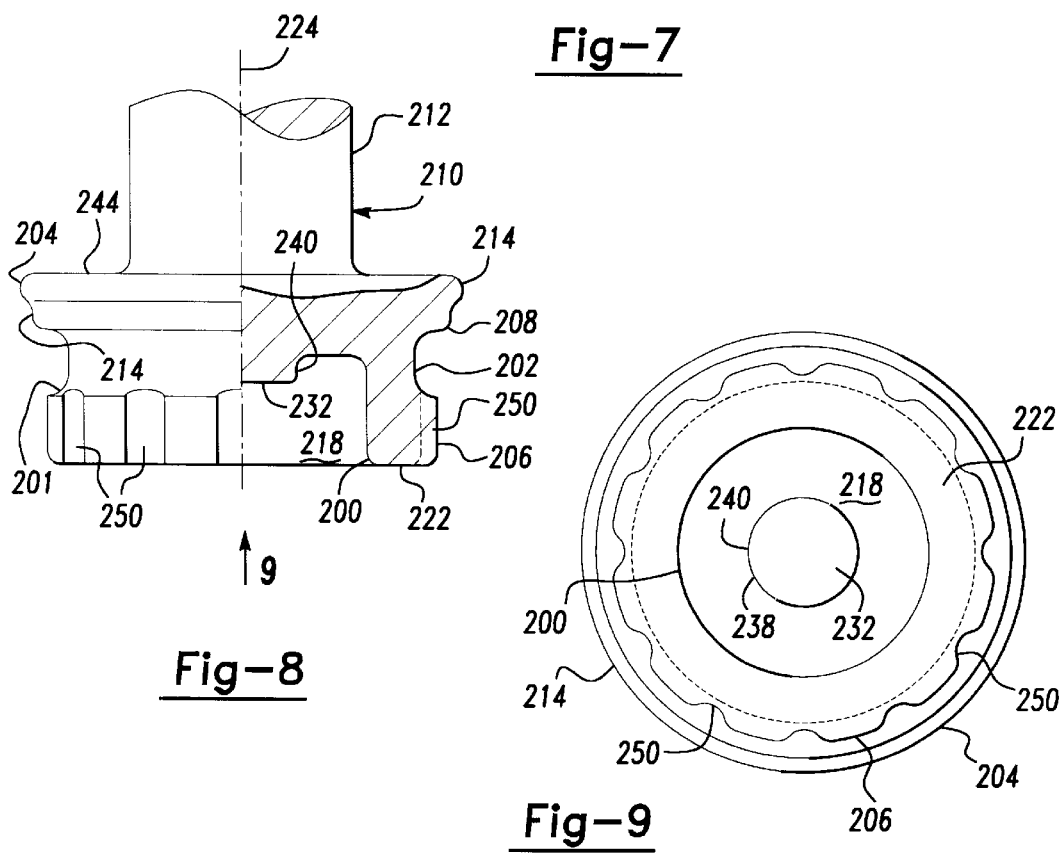

FIG. 8 now shows a modified embodiment of the functional element 210, in which the hollow cavity 218 is formed as an at least substantially cylindrical hollow space, and the ring wall 230, which projects from the base surface of the hollow cavity 218, is formed as a solid cylindrical projection, the cylindrical outer surface 240 of which merges via a rounded edge 238 into a planar end face 232.

The transition from the cylindrical hollow cavity 218 into the end face 222 of the head part is also of rounded design, as indicated by the reference numeral 200.

Figure 9:
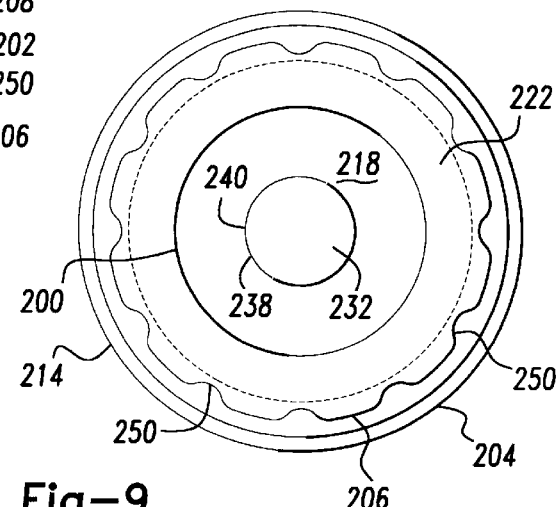

One notes that in the embodiment of FIGS. 8 and 9 no undercut features are provided in the hollow cavity 218. In place of this, an undercut in the form of a ring-like recess 202 is formed in this embodiment in the outer periphery of the head part 214. This ring-like recess 202 is located in the region of the outer periphery between the ring nose 204 in the region of the transition from the end face 244 into the outer periphery 201 of the head part 214 and the lower region 206 of the outer periphery of the head part 214 adjacent to the end face 222 remote from the shaft part 212.

This lower region 206 of the outer periphery of the head part 214 has a larger diameter than the deepest point of the ring-like recess 202 and is in another respects provided with longitudinal grooves 250 in accordance with the embodiment of FIGS. 3 and 4 which serve to provide security against rotation.

It can, in other respects, be seen from FIG. 8 that a ring bead 208 exists beneath the ring nose 204. This ring bead plays an important role during the setting movement, as will be explained later.

In this embodiment the design of the shaft part 212 can also be selected as desired.

The insertion of the functional element 210 of the embodiment of FIGS. 8 and 9 will now be explained in more detail with reference to the FIGS. 10 to 13. In this embodiment the attachment of the functional element 210 also takes place by means of a setting head 254, which, in accordance with the embodiment of FIGS. 6 and 7, likewise has a tubular housing part 257 which is spring-biased downwardly and a plunger 256 movable coaxially to the housing part 257, with the plunger 256 pressing against the end face 244 of the functional element 210 adjacent to the shaft part 212.

In deviation from the illustration of FIG. 6, the end face of the cylindrical plunger 256 is here provided with a projecting outer rim 210 and a ring-like recess 212, which lies radially within this outer rim, so that initially only the end face of the projecting ring region 210 enters into contact with the end face 214 of the head part 14.

Figure 10:
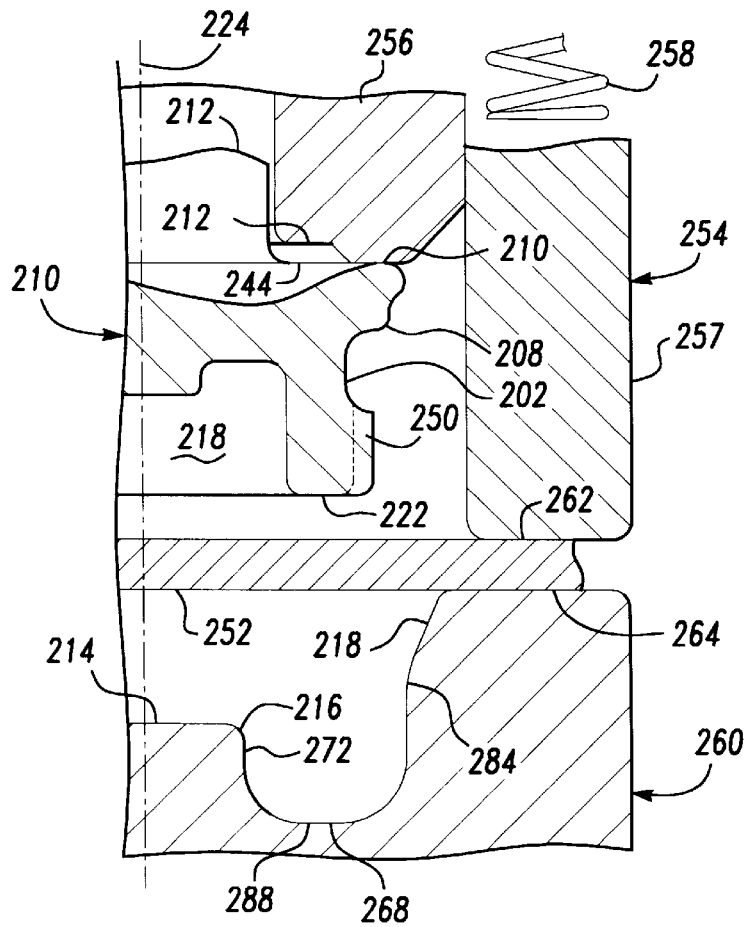

FIG. 10 shows how the sheet metal material 252 is clamped in the form of a planar sheet metal panel between the end face 262 of the housing 257 and the planar end face 264 of the die button 260 at the start of the setting movement.

The die button 260 is provided in accordance with the die button of FIG. 6, with a ring like recess 238 having a planar base surface 288 and likewise has a cylindrical projection 272 which, however, here only has a planar end face 214 arranged perpendicular to the longitudinal axis 224 at the top, with this end face merging via a rounded shaping edge 216 into the cylindrical wall of the projection 272.

Likewise in deviation from the design of FIG. 6, the outer wall of the recess 268 is in this embodiment not vertically arranged, but rather diverges in the direction towards the end face 264 of the die button 260. The transition from the peripheral wall 284 of the recess into the end face 264 is here likewise formed as a rounded shaping edge 218.

Figure 11:
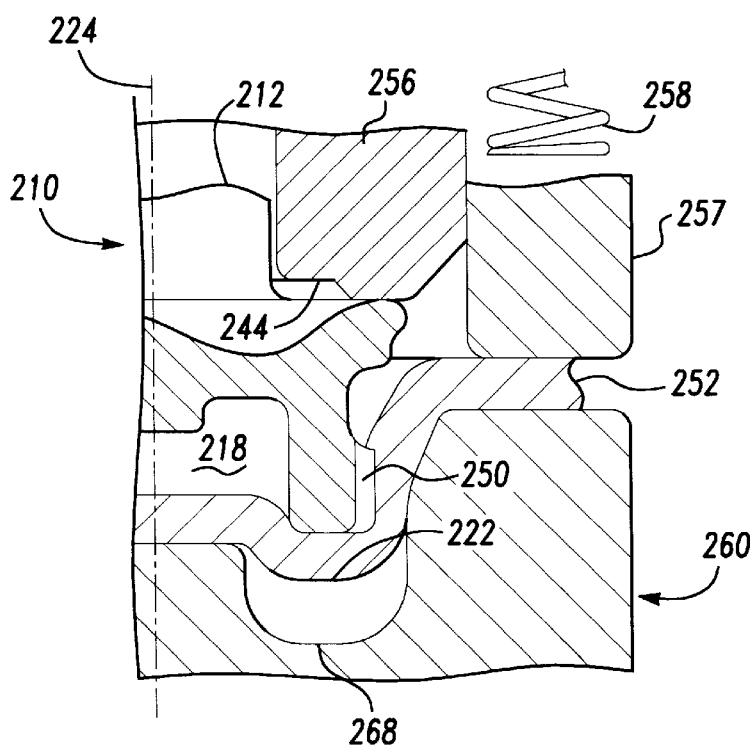
Figure 12:
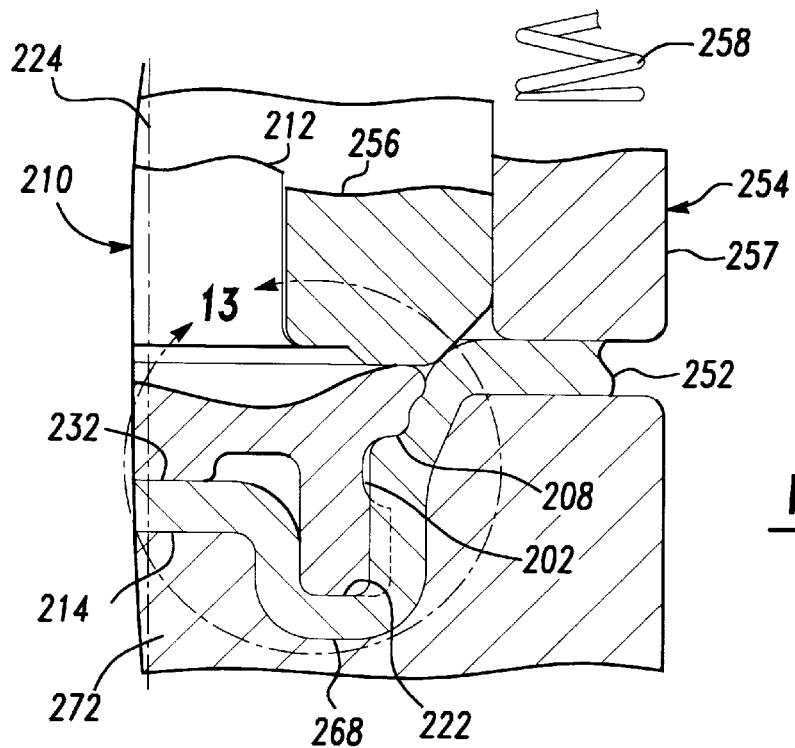

FIG. 11 now shows an intermediate stage of the connection of the functional element 210 with the sheet metal part 252. One notes that the planar end face 222 of the head part has pressed the sheet metal material 252 into the ring recess 268, with the sheet metal material starting, as a result of the slightly conically shaped peripheral wall 284 of the ring recess 268, to move into the grooves 250 in the lower region of the outer periphery of the head part 214. At the same time, the cylindrical projection 272 results in a deformation of the sheet metal material 252 into the hollow cavity 218. The end state can then be seen in FIG. 12.

It can initially be seen from this drawing that the sheet metal material 252 has been fully pressed into the recess 268 of the die button 260, with the cylindrical projection 272 having clamped the sheet metal material between its end face 214 at the opposite end face 232 of the cylindrical projection in the hollow cavity 218 of the head part 214.

One also notes that during the further closing movement of the tool, the ring bead 208 has pressed into the sheet metal material 252 and, in conjunction with the slightly conically diverging peripheral wall 216 of the die button 260 has pushed sheet metal material into the ring-like undercut 202. The undercut 202, or the corresponding ring recess is not fully filled out in order to provide space to receive the sheet metal material, depending on the actual sheet metal thickness.

However, in this embodiment, in addition to the above-mentioned movement, the material of the head part of the functional element is also deformed during the closing of the tool, and indeed in such a way that the ring collar 210 of the plunger 256 has formed a corresponding recess in the head part 214 of the functional element, and the end face of the plunger 256 now fully contacts the deformed end face 244 of the head part. The material which is pressed away by this deformation has been pressed, on the one hand, into the sheet metal material 252, and, on the other hand, however also contributed to the movement of the sheet metal material into the undercut 202. This special design of the end face of the plungers 256 is admittedly not essential in this embodiment. It is, however, very useful in order to produce adequate strength in the connection between the functional element 210 and the sheet metal part 252. Here also it can clearly be seen that a form-fitted connection has been achieved in the region of the undercut 202, to which it should be said that the sheet metal material 252 comes into contact on the noses of the head part 214 formed between the grooves 250 and prevents the functional element being pulled out. This security against rotation is achieved in this embodiment in that the sheet material is pressed into the grooves 250.

Figure 13:
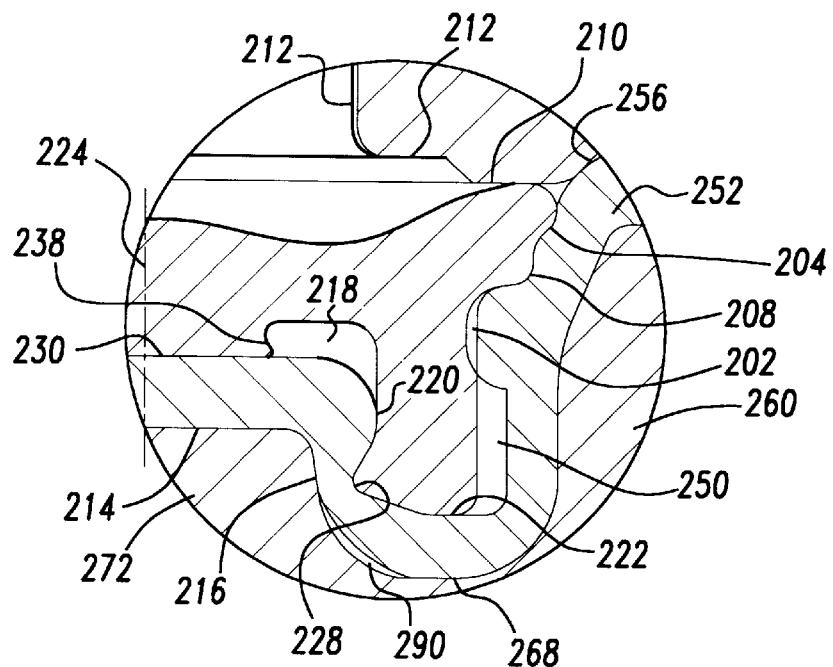

FIG. 13 shows on the one hand a somewhat enlarged representation of the final shape in the region of the undercut 202, but also shows that the hollow cavity 218 can additionally be provided with a ring nose 228, so that an undercut 220 also arises in this embodiment and a hooked connection of the sheet metal material with this undercut 220 can also take place here, which has the form of a ring-like undercut.

One also sees from the representation of FIG. 13 that the cylindrical projection 230 is likewise deformed by the setting movement and that the forming edge 238 has moved radially outwardly as a result of this deformation and has hereby pushed the sheet metal material into the undercut 220.

The design here in the region of the hollow cavity 218 corresponds at least substantially to the design of the embodiment in accordance with FIGS. 3 and 4. Here also one sees that the sheet metal material has the form of a continuous membrane so that an absolutely sealed connection was produced. All forming edges are also of rounded design here in order to avoid as far as possible an injury of the sheet metal material in the sense of a perforation of the latter or undesired damage to any coating that may be present. In this embodiment free spaces are also produced in the region of the head part and provide additional take-up space, depending on the sheet metal thickness and the sheet metal material.

It is namely an advantage of all the examples given here that one can work with one and the same functional element with several different sheet metal thicknesses. It is only necessary to adapt the die button to the sheet metal thickness.

The shape of the die button for the insertion of the embodiment of FIGS. 3 and 4 has not been separately shown. It has, however, substantially the same shape as the die button of the embodiment of FIG. 6, but with the exception that the outer ring wall 284 of the recess 268 is made slightly divergent in order to ensure a high quality form-fitted connection with the grooves 250, without injuring the sheet metal. This conical shape is, however, not absolutely essential during the attachment of a functional element in accordance with FIGS. 3 and 4. The slight conical shape of the die button has, however, the additional advantage that the sheet metal part is easily released from the die button during the opening of the tool.

Figure 14:
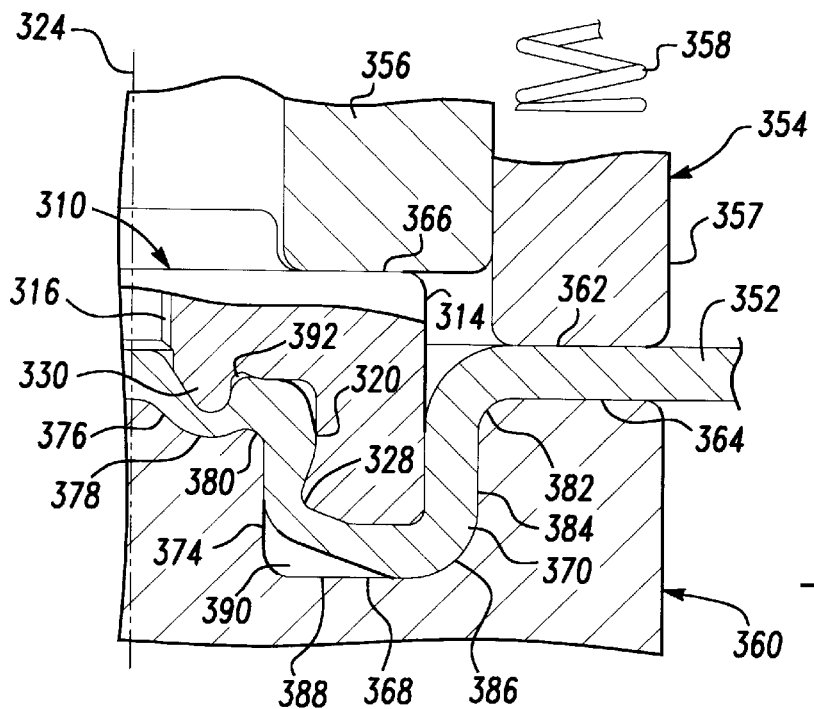
Figure 15:
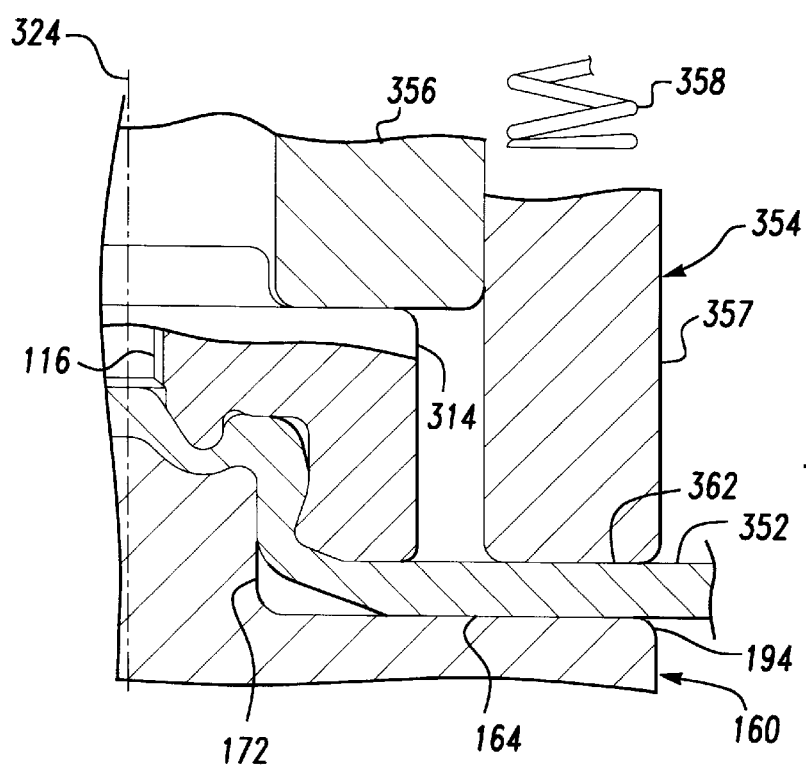
Figure 16:
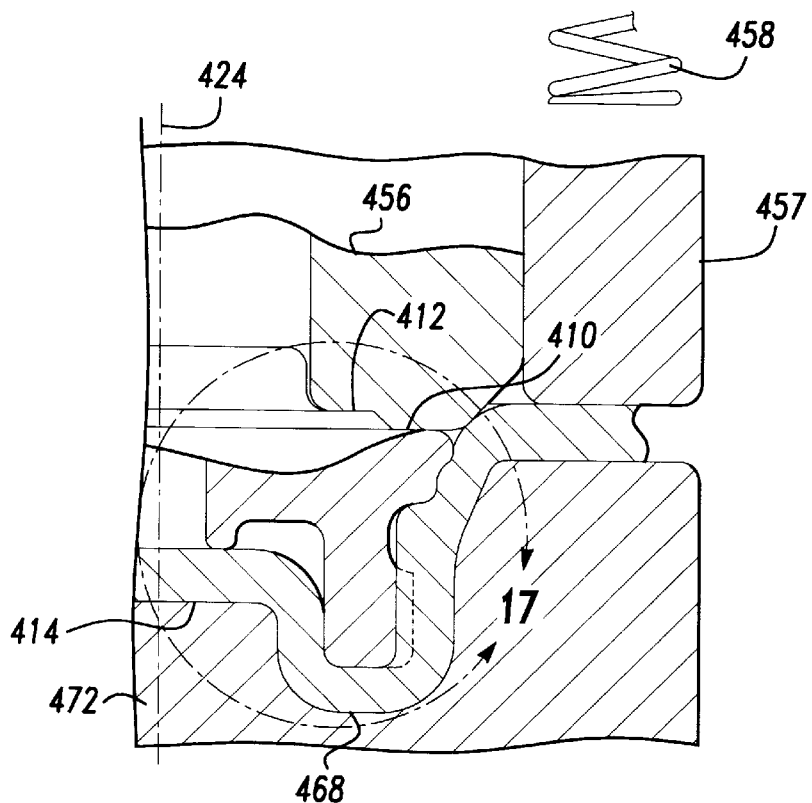
FIGS. 16 and 17 is a further modified element.
Figure 17:
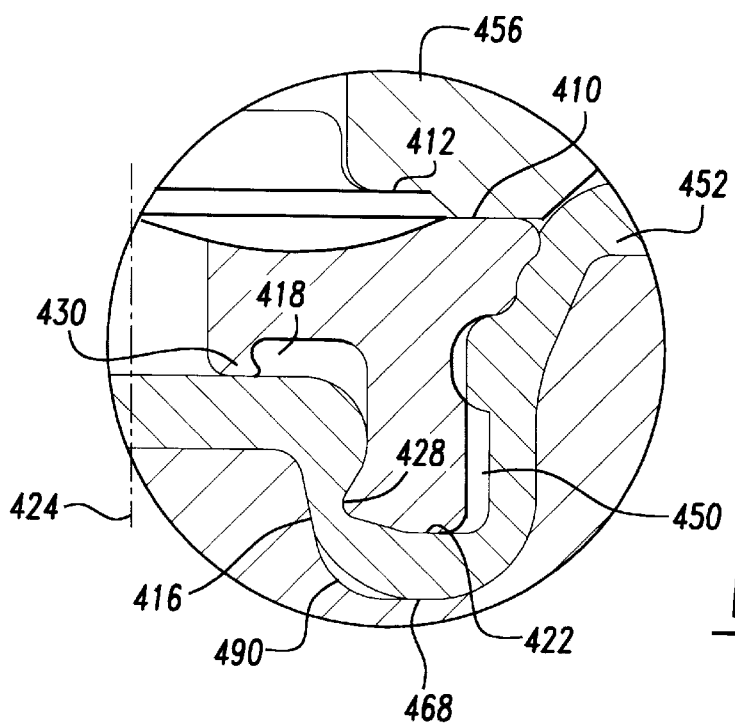

Finally, the FIGS. 14, 15, 16 and 17 show that the invention can also be clearly realized with functional elements in the form of hollow elements such as nuts. In the FIGS. 14 to 17 the reference numerals are in the same sequence as used in the corresponding FIGS. 6, 7, 12 and 13. In FIGS. 14 and 15, the corresponding parts and elements are numbered in the 300 sequence and parts and elements of the modified embodiment of FIGS. 16 and 17 are numbered in the 400 series for reference to the embodiments shown in the prior figures described in more detail above. The die member 160 in FIG. 15 may be identical to the die member 60 of FIG. 7 and is numbered in the 100 series. A separate description of these FIGS. 14 to 17 is thus not necessary. In these Figures the hollow part 314 and 414 takes the place of the head part. It must simply be ensured that the hollow element is not deformed in undesired manner during the attachment, although a deformation could, under some circumstances, be intentional, for example in order to produce a narrow portion at the entry to the hollow element. A narrow portion of this kind could, for example, be useful to realize a snap connection with a correspondingly shaped male part. For ease of reference, the parts are numbered in the same sequence as the previous figures.

As examples for the sheet metal materials, which come into question, one should name ST12 to ST15, DIN 16 and ZStE qualities 220 to 430. As far as the functional elements are concerned, one could use materials in accordance with DIN 1654 (cold heading steels), such as frequently enter into consideration for functional elements.

All examples have the additional advantage that an extensive protection is given against tilting and levering out of the functional element. This applies in particular to the embodiments of FIGS. 6, 12 and 13, with the head part 14 and 114 are clamped between the two pot-like regions of the sheet metal part.

What is claimed is:

1. A functional element for attachment to a sheet metal component without penetrating or perforating the sheet metal component, the functional element comprising a shaft part and a coaxially aligned head part defining a longitudinal axis, said head part having at least one radially outer side, a component contacting end face, a recess in said head part and component shaping edges, wherein said recess extends at least partly through said head part from said component contacting end face toward said shaft part, has an inner side wall spaced from said radially outer side of said head part and a plurality of radially inwardly projecting noses defining a plurality of undercuts in said inner side wall, wherein a plurality of generally radial inclined notches is provided in said component contacting end face, each said notch being provided at a radial position around said component contacting end face corresponding to a radial position of a respective one of said noses on said inner side wall of said recess, wherein said recess has a base surface spaced from said component contacting end face and wherein an integral cylindrical projection is provided at said base surface projecting towards said component contacting end face, but terminating at an end spaced axially inwardly from said component contacting end face, and wherein said component shaping edges are exclusively rounded shaping edges preventing piercing of said sheet metal part.

2. A functional element in accordance with claim 1, wherein said cylindrical projection is a ring wall having a hollow circular end with a chamfer or a rounded edge at an inner side thereof and a rounded edge at an outer side thereof.

3. A functional element in accordance with claim 1, wherein said cylindrical projection has a circular planar surface at said end, which extends at least substantially perpendicular to said longitudinal axis.

4. A functional element in accordance with claim 3, wherein said planar surface merges via a rounded edge into a cylindrical or conical radially outer wall of said cylindrical projection.

5. A functional element in accordance with claim 1, wherein shaped features providing security against rotation are provided at said cylindrical projection.

6. A functional element in accordance with claim 5, wherein said shaped features are provided at said end of said cylindrical projection.

7. A functional element in accordance with claim 1 wherein said head part has a flange at a transition from said head part to said shaft part, wherein an outwardly projecting ring nose is provided at said radially outer side of said head part adjacent said component contacting end face, and wherein a further undercut is provided in said radially outer side between said outwardly projecting ring nose and said flange.

8. A functional element in accordance with claim 7, wherein a ring bead is provided at said radial outer side between said further undercut and said flange.

9. A functional element in accordance with claim 7, wherein a plurality of axially extending grooves are provided in said outwardly projecting ring nose.

10. A functional element in accordance with claim 9, wherein said plurality of axially extending grooves each extend from a position proximate to said component contacting end face to said further undercut.

11. A functional element in accordance with claim 1, wherein said radially outer side defines an outer polygonal shape of said head part.

12. A functional element for attachment to a sheet metal component without penetrating or perforating the sheet metal component, the functional element comprising a shaft part and a coaxially aligned bead part defining a longitudinal axis, said head part having at least one radially outer side, a component contacting end face, a recess in said head part and component shaping edges, wherein said recess extends at least partly through said head part from said component contacting end face towards said shaft part and has an inner side wall spaced from said radially outer side of said head part, a radially inwardly projecting ring nose defining a ring recess in said inner side wall and a base surface spaced from said component contacting end face, wherein an integral cylindrical projection is provided at said base surface projecting towards said component contacting end face, but terminating at an end spaced axially inwardly from said component contacting end face and axially inwardly of said ring nose, and wherein said component shaping edges are exclusively rounded shaped edges preventing piercing of said sheet metal part.

13. A functional element for attachment to a sheet metal component without penetrating or perforating the sheet metal component, the functional element comprising a shaft part and a coaxially aligned head part defining a longitudinal axis, said head part having at least one radially outer side, a component contacting end face and part shaping edges, wherein said head part has a radial flange at a transition from said head part to said shaft part, wherein an outwardly projecting ring nose is provided at said radially outer side of said head part adjacent said component contacting end face, and wherein an undercut is provided in said radially outer side between said outwardly projecting ring nose and said flange, wherein a ring bead is provided at said radially outer side between said undercut and said flange, and wherein said component shaping edges are exclusively rounded shaping edges preventing piercing of said sheet metal part.

14. A functional element in accordance with claim 13, wherein a plurality of axially extending grooves are provided in said outwardly projecting ring nose.

15. A functional element in accordance with claim 14, wherein said plurality of axially extending grooves each extend from a position proximate to said component contacting end face to said further undercut.

16. A functional element in accordance with claim 13 and further comprising a recess in said head part and extending at least partly through said head part form said component contacting end face towards said shaft part, wherein said recess has a base surface spaced from said component contacting end face, and wherein a cylindrical projection is provided at said base surface projecting towards said component contacting end face but terminating at an end spaced axially inwardly from said component contacting end face.

17. A functional element in accordance with claim 16, wherein said cylindrical projection had a circular planar surface at said end, which extends at least substantially perpendicular to said axis.

18. A functional element in accordance with claim 17, wherein said planar surface merges via a rounded edge into a cylindrical or conical radially outer wall of said cylindrical projection.

* * * * *